(12) United States Patent
Park et al.

(10) Patent No.: US 10,467,947 B2
(45) Date of Patent: Nov. 5, 2019

(54) DISPLAY DEVICE

(71) Applicant: Samsung Display Co., Ltd., Yongin-si, Gyeonggi-Do (KR)

(72) Inventors: Ji-Eun Park, Hwaseong-si (KR); Jae-Keun Lim, Suwon-si (KR); Jin-Woo Noh, Hwaseong-si (KR); Young-Wook Yoo, Suwon-si (KR); Hassan Kamal, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 162 days.

(21) Appl. No.: 15/626,878

(22) Filed: Jun. 19, 2017

(65) Prior Publication Data
US 2018/0012534 A1    Jan. 11, 2018

(30) Foreign Application Priority Data

Jul. 7, 2016 (KR) .................. 10-2016-0086287

(51) Int. Cl.
*G09G 3/00* (2006.01)
*G09G 3/20* (2006.01)
*G02B 27/22* (2018.01)
*G02B 27/01* (2006.01)

(52) U.S. Cl.
CPC ....... *G09G 3/2092* (2013.01); *G02B 27/0172* (2013.01); *G02B 27/225* (2013.01); *G09G 3/003* (2013.01); *G09G 3/2003* (2013.01); *G02B 2027/0134* (2013.01); *G02B 2027/0178* (2013.01); *G09G 2300/0452* (2013.01); *G09G 2310/08* (2013.01); *G09G 2340/0457* (2013.01)

(58) Field of Classification Search
CPC .......... G02B 27/01; G09G 2300/0452; G09G 2310/08; G09G 2340/0457; G09G 3/003; G09G 3/2003; G09G 3/2092
See application file for complete search history.

(56) References Cited

U.S. PATENT DOCUMENTS

| | | | |
|---|---|---|---|
| 8,743,188 B2 * | 6/2014 | Kim .................. | H04N 13/0422 348/42 |
| 9,927,617 B2 * | 3/2018 | Morimoto ............ | G02B 27/017 |
| 2002/0130821 A1 * | 9/2002 | Bronson .............. | G02B 27/017 345/8 |

(Continued)

FOREIGN PATENT DOCUMENTS

| | | |
|---|---|---|
| JP | 06-138432 A | 5/1994 |
| KR | 10-2013-0105145 A | 9/2013 |

*Primary Examiner* — Kenneth Bukowski
(74) *Attorney, Agent, or Firm* — Innovation Counsel LLP

(57) ABSTRACT

A display device includes a first display region, a second display region, a first lens, and a second lens. The first display region includes a first pixel subset and may display a first image. The first image includes a first sub-image corresponding to the first pixel subset and smaller than the first image. The second display region neighbors the first display region, includes a second pixel subset, and may display a second image. The second image includes a second sub-image corresponding to the second pixel subset and smaller than the second image. The second pixel subset is not identical to the first pixel subset. The first lens may show the first sub-image without providing the entire first image. The second lens may show the second sub-image without providing the entire second image when the first lens shows the first sub-image.

20 Claims, 14 Drawing Sheets

(56) References Cited

U.S. PATENT DOCUMENTS

| | | | |
|---|---|---|---|
| 2004/0233275 A1* | 11/2004 | Tomita | G02B 27/0093 348/51 |
| 2009/0051759 A1* | 2/2009 | Adkins | G02B 27/2264 348/53 |
| 2009/0278918 A1* | 11/2009 | Marcus | G02B 27/2228 348/54 |
| 2010/0045779 A1* | 2/2010 | Kwon | H04N 5/44504 348/46 |
| 2011/0057965 A1* | 3/2011 | Park | G09G 3/003 345/690 |
| 2011/0063423 A1* | 3/2011 | Yamada | G02B 27/2264 348/56 |
| 2011/0109732 A1* | 5/2011 | Ota | G09G 3/003 348/54 |
| 2011/0234773 A1* | 9/2011 | Koh | G09G 3/003 348/56 |
| 2013/0002834 A1* | 1/2013 | Aiba | G09G 3/003 348/51 |
| 2013/0070005 A1* | 3/2013 | Tokumura | G09G 3/003 345/691 |
| 2013/0342590 A1* | 12/2013 | Lee | G09G 5/10 345/691 |
| 2014/0176528 A1* | 6/2014 | Robbins | G02B 27/225 345/419 |
| 2016/0182901 A1* | 6/2016 | Lee | G09G 3/003 345/691 |
| 2016/0219260 A1* | 7/2016 | Sato | H04N 13/0402 |
| 2017/0115489 A1* | 4/2017 | Hu | G02B 27/0172 |
| 2017/0160550 A1* | 6/2017 | Kobayashi | G02B 27/017 |
| 2017/0212717 A1* | 7/2017 | Zhang | G06F 3/1423 |
| 2018/0005563 A1* | 1/2018 | Lee | G09G 3/002 |
| 2018/0039107 A1* | 2/2018 | Sasaki | G02F 1/1309 |

* cited by examiner

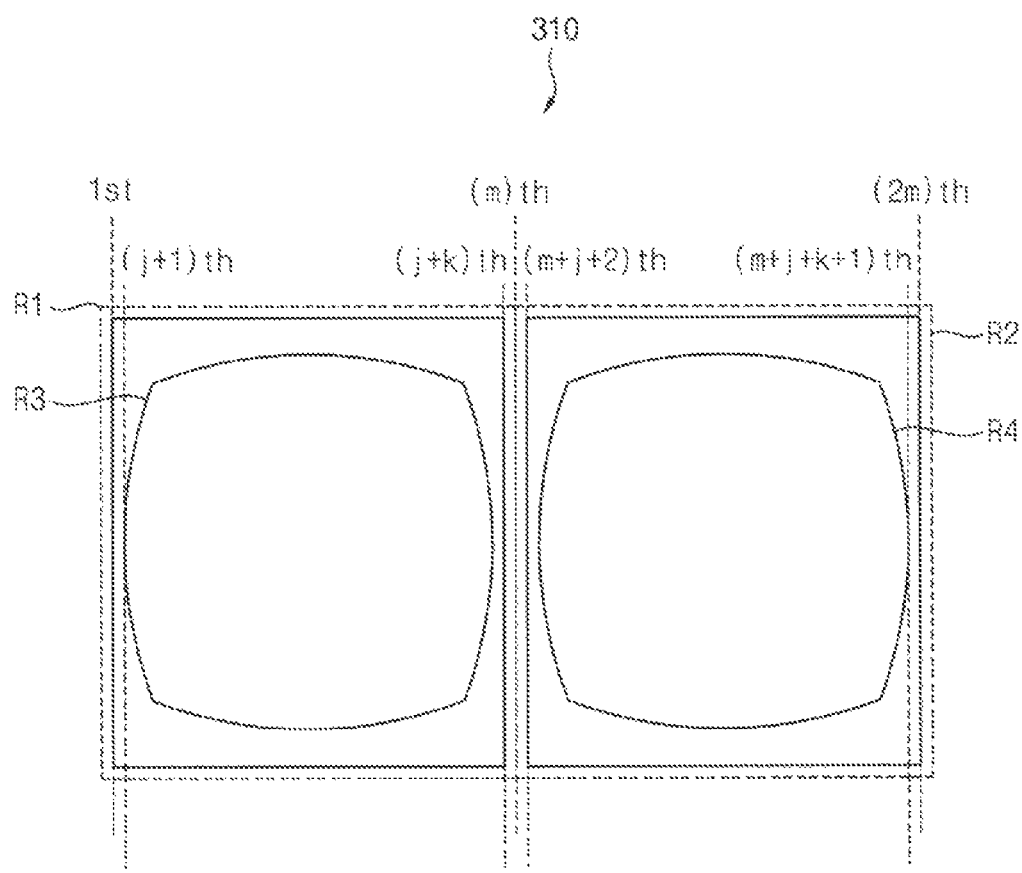

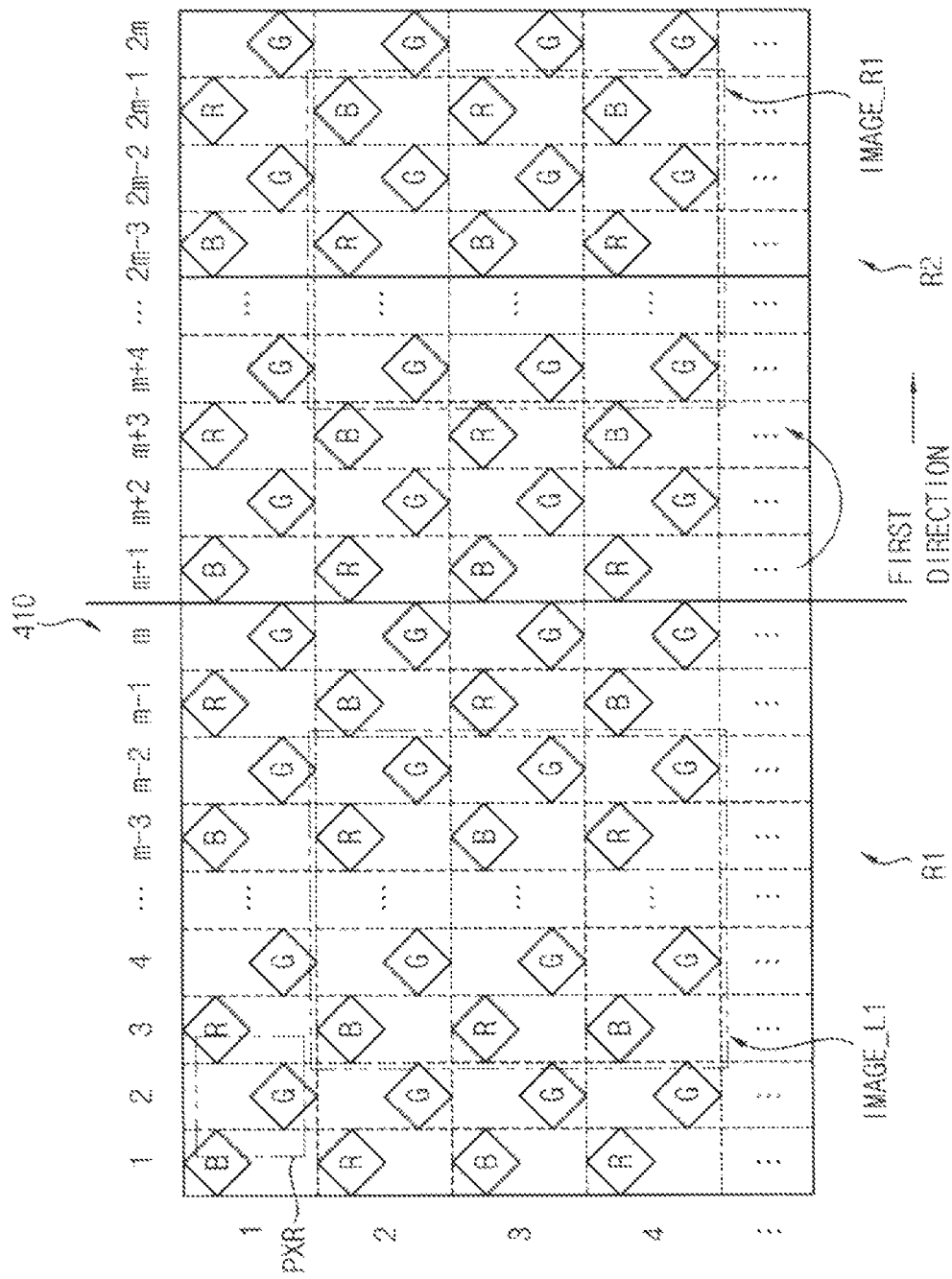

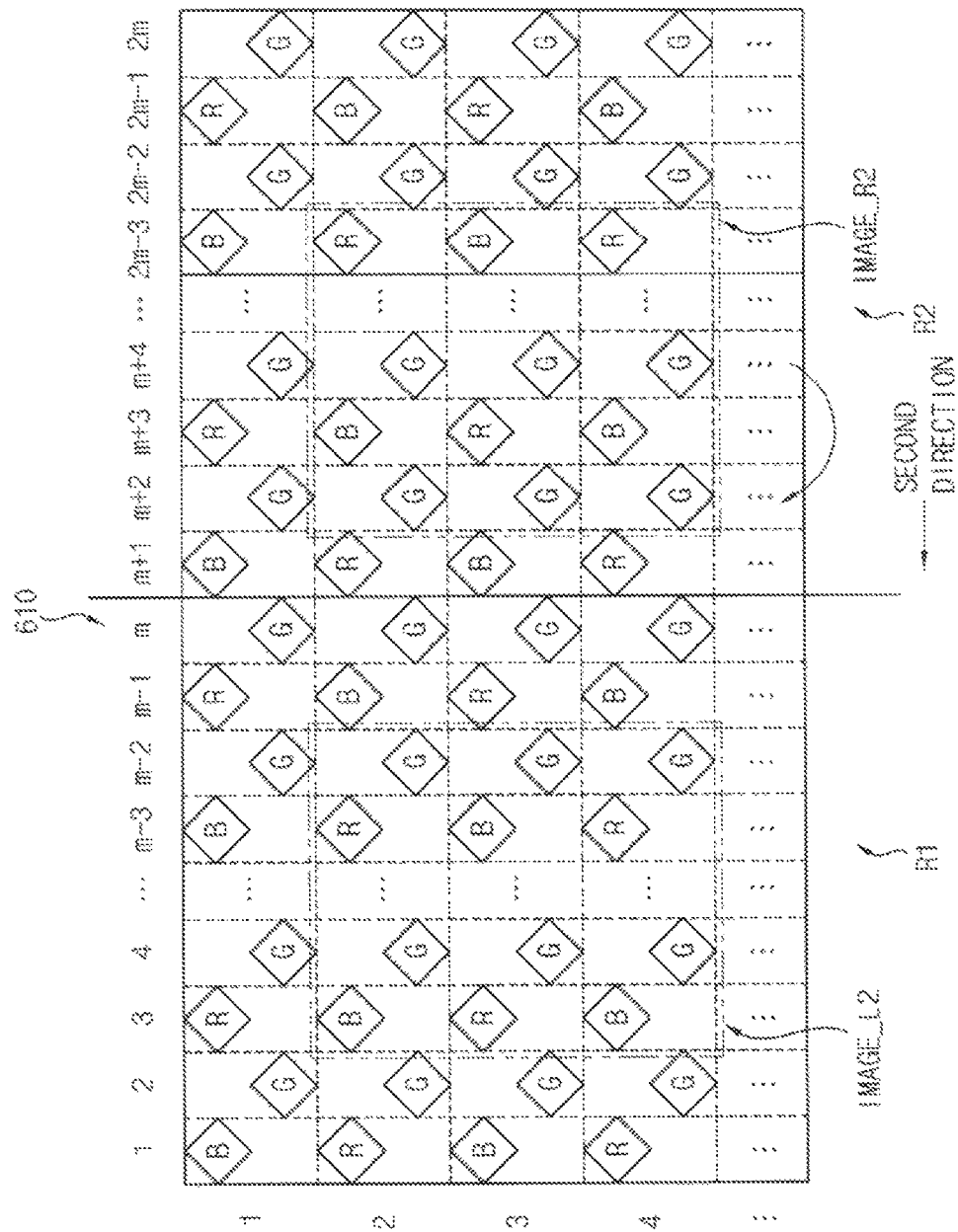

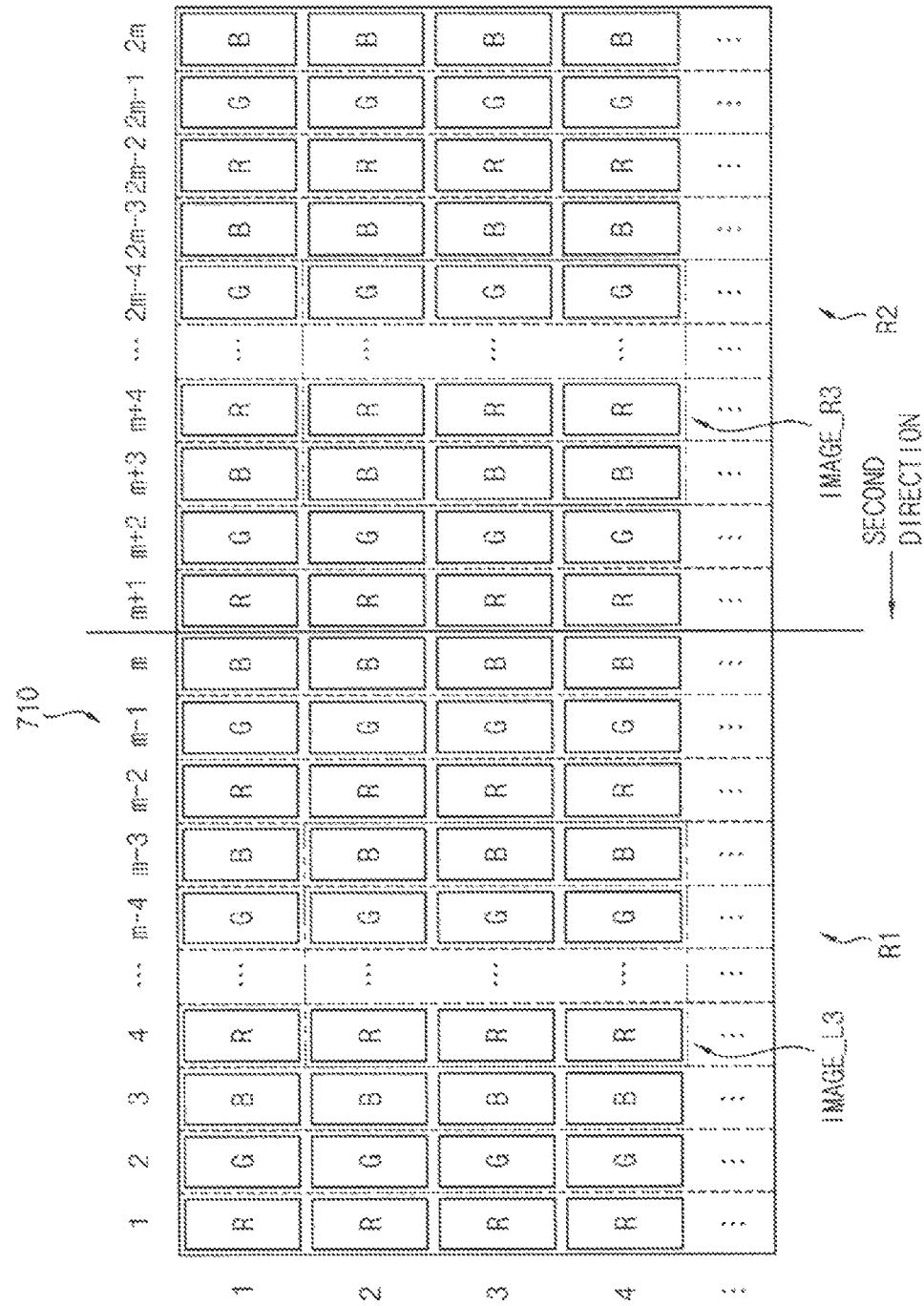

DISPLAY DEVICE

CROSS-REFERENCE TO RELATED APPLICATION(S)

This application claims priority under 35 USC § 119 to Korean Patent Application No. 10-2016-0086287, filed on Jul. 7, 2016 in the Korean Intellectual Property Office (KIPO); the contents of the Korean Patent Application are incorporated herein by reference.

BACKGROUND

1. Technical Field

The technical field is related to a display device, such as a head mounted display device, and a method of operating the display device.

2. Description of the Related Art

A head mounted display device (HMD) may be mounted on a head of a user, may enlarge an image using a lens, and may provide the image to one or two eyes of the user.

The lens may cause a screen door effect or an artifact in the displayed image to be conspicuous to the user. As a result, the perceived quality of the image may be unsatisfactory.

SUMMARY

Embodiments may be related to a display device that may display images with minimum or substantially no visible or conspicuous artifacts.

According to example embodiments, a display device may include the following elements: a display panel including a first displaying region and a second displaying region corresponding to the first displaying region; a timing controller configured to generate converted data by changing orders of line data included in second image data corresponding to the second displaying region; and a data driver configured to generate data signals based on the converted data and to provide the data signals to the display panel.

In example embodiments, the first displaying region may correspond to a left eye of a user, and the second displaying region may correspond to a right eye of the user.

In example embodiments, the timing controller may generate the converted data by maintaining orders of line data included in the first image data corresponding to the first displaying region.

In example embodiments, the second displaying region may include first type pixel columns and second type pixel columns arranged alternately, and the timing controller may generate the converted data by shifting first line data corresponding to the first type pixel columns in a first direction.

In example embodiments, the first type pixel columns may include a first pixel emitting a light with a first color, and the second type pixel columns may include a second pixel emitting a light with a second color.

In example embodiments, the first type pixel columns may further include a third pixel emitting a light with a third color.

In example embodiments, the timing controller may map a kth line data corresponding to a kth pixel column to a k+1th pixel column adjacent to the kth pixel column, where k is a positive integer, and the kth pixel column and the k+1th pixel column are included in the first type pixel columns.

In example embodiments, the timing controller may map a kth line data corresponding to a kth pixel column to a k−1th pixel column adjacent to the kth pixel column, where k is a positive integer, and the kth pixel column and the k−1th pixel column are included in the first type pixel columns.

In example embodiments, the display panel may include pixels arranged in Pentile format, and the timing controller may generate the converted data by applying a second sub-pixel rendering filter to the second image data.

In example embodiments, the second image data may include first sub-data and second sub-data, and the timing controller may apply the second sub-pixel rendering filter to the first sub-data.

In example embodiments, the second sub-pixel rendering filter may have weights for a first adjacent pixel and a second adjacent pixel, where the first adjacent pixel is adjacent to a target pixel, and the second adjacent pixel is adjacent to the first adjacent pixel.

In example embodiments, the timing controller may generate the converted data by applying a first sub-pixel rendering filter to first image data corresponding to the first displaying region, where the first sub-pixel rendering filter is different from the second sub-pixel rendering filter.

In example embodiments, the first sub-pixel rendering filter may have weights for a target pixel and a first adjacent pixel, where the first adjacent pixel is adjacent to the target pixel.

In example embodiments, the display panel may include pixels arranged in Pentile format, and the timing controller may generate the converted data by applying a third sub-pixel rendering filter to the second image data.

In example embodiments, the second image data may include first sub-data and second sub-data, and the timing controller may apply the third sub-pixel rendering filter to the second sub-data.

In example embodiments, the third sub-pixel rendering filter may have a weight for a third adjacent pixel, where the third adjacent pixel is adjacent to a target pixel.

According to example embodiments, a display device may include the following elements: a first display panel having a first pixel arrangement; a second display panel corresponding to the first display panel and having a second pixel arrangement; a timing controller configured to generate first converted data corresponding to the first display panel based on stereoscopic image data and to generate second converted data corresponding to the second display panel based on the stereoscopic image data; and a data driver configured to generate data signals based on the first converted data and the second converted data and to provide the data signals to the first display panel and the second display panel.

In example embodiments, the second pixel arrangement may be opposite to the first pixel arrangement.

According to example embodiments, a display device may include the following elements: a display panel including a first displaying region and a second displaying region corresponding to the first displaying region; and a data driver configured to generate second line data signals based on the second line data included in second image data corresponding to the second displaying region and to provide the second line data to the display panel by changing orders of the second line data.

In example embodiments, the data driver may shift at least a portion of the second line data in a first direction.

Example embodiments may be related to a display device, e.g., a head-mounted display device. The display device may include a first display region, a second display region, a first lens, and a second lens. The first display region may include a first pixel subset and may display a first image. The first image may include a first sub-image. The first sub-image may correspond to the first pixel subset and may be smaller than the first image. The second display region may neighbor the first display region, may include a second pixel subset, and may display a second image. The second image may include a second sub-image. The second sub-image may correspond to the second pixel subset and may be smaller than the second image. The second pixel subset may not be identical to the first pixel subset. The first lens may overlap the first display region and may show (and/or provide) the first sub-image without showing all of the first image (i.e., without showing the entire first image). The second lens may overlap the second display region and may show (and/or provide) the second sub-image without showing all of the second image (i.e., without showing the entire second image) when the first lens shows the first sub-image.

The display device may include a controller. The controller may receive a first data set and a second data set, may produce a converted data set by changing pixel-mapping for the second data set, and may output the first data set and the converted data set. The first display region may display the first sub-image according to the first data set. The second display region may display the second sub-image according to the converted data set.

The display device may include a controller. The controller may include a first filter and a second filter, may receive a first data set and a second data set, may produce a first filtered data set by applying the first filter to the first data set, may produce a second filtered data set by applying the second filter to the second data set, and may output the first filtered data set and the second filtered data set. A quantity of weight parameters in the second filter may be greater than a quantity of weight parameters in the first filter. The first display region may display the first sub-image according to the first filtered data set. The second display region may display the second sub-image according to the second filtered data set.

The first filter may include a first weight parameter and a second weight parameter. The first weight parameter may correspond to a first-region target pixel in the first display region. The second weight parameter may correspond to a first-region neighboring pixel in the first display region. The first-region neighboring pixel may immediately neighbor the first-region target pixel. The second filter may include a third weight parameter. The third weight parameter may correspond to a second-region target pixel in the second display region and may be equal to the second weight parameter.

The second filter may include a fourth weight parameter. The fourth weight parameter may correspond to a second-region neighboring pixel in the second display region and may be equal to the first weight parameter. The second-region neighboring pixel may immediately neighbor the second-region target pixel.

The first-region neighboring pixel may be positioned at a right side of the first-region target pixel. The second-region neighboring pixel may be positioned at a left side of the second-region target pixel.

Each of the first weight parameter and the fourth weight parameter may be equal to ½. Each of the second weight parameter and the third weight parameter may be equal to 0.

A first leftmost pixel column of the second pixel subset may be identical to a second leftmost pixel column of the first pixel subset and may not be identical to a first leftmost pixel column of the first pixel subset.

A first rightmost pixel column of the first pixel subset may be identical to a second rightmost pixel column of the second pixel subset and may not be identical to a first rightmost pixel column of the second pixel subset.

A first leftmost pixel column of the first pixel subset may include a first first-color pixel without including any second-color pixel. A first leftmost pixel column of the second pixel subset may include a first second-color pixel without including any first-color pixel.

The first leftmost pixel column of the first pixel subset may include a third-color pixel. The first leftmost pixel column of the second pixel subset may include no third-color pixel.

A first rightmost pixel column of the first pixel subset may include a second second-color pixel without including any first-color pixel. A first rightmost pixel column of the second pixel subset may include a second first-color pixel without including any second-color pixel.

The first rightmost pixel column of the first pixel subset may include no third-color pixel. The first rightmost pixel column of the second pixel subset may include a third-color pixel.

The first display region may include a first pixel set without including any other pixels. The first pixel set may include the first pixel subset. The second display region may include a second pixel set without including any other pixels. The second pixel set may include the second pixel subset. The first pixel set may be identical to the second pixel set.

A distance between a first leftmost pixel column of the first pixel set and a first leftmost pixel column of the first pixel subset may be unequal to a distance between a first leftmost pixel column of the second pixel set and a first leftmost pixel column of the second pixel subset.

A distance between a first leftmost pixel column of the first pixel set and a first leftmost pixel column of the first pixel subset may be greater than a distance between a first leftmost pixel column of the second pixel set and a first leftmost pixel column of the second pixel subset by at least a width of a pixel column in the display device.

A distance between a first leftmost pixel column of the first pixel set and a first leftmost pixel column of the first pixel subset may be greater than a distance between a first leftmost pixel column of the second pixel set and a first leftmost pixel column of the second pixel subset by a width of a pixel column in the display device.

The first display region may include a first pixel set without including any other pixels. The first pixel set may include the first pixel subset. The second display region may include a second pixel set without including any other pixels. The second pixel set may include the second pixel subset. The first pixel set may not be identical to the second pixel set.

A first leftmost pixel column of the second pixel set may be identical to a second leftmost pixel column of the first pixel set and may be not identical to a first leftmost pixel column of the first pixel set.

Example embodiments may be related to a method of operating a display device. The display device may include a first display region, a second display region, a first lens, and a second lens. The method may include displaying a first image using a first display region. The first display region may include a first pixel subset. The first image may include a first sub-image. The first sub-image may correspond to the first pixel subset and may be smaller than the first image. The method may include displaying a second image using a second display region. The second display region neighbors the first display region and may include a second pixel subset. The second image may include a second sub-image. The second sub-image may correspond to the second pixel subset and may be smaller than the second image. The second pixel subset may not be identical to the first pixel subset. The method may include providing (and/or showing) the first sub-image through the first lens without providing all of the first image (i.e., without providing the entire first image) through the first lens. The first lens may overlap the first display region. The method may include providing (and/or showing) the second sub-image through the second lens without providing all of the second image (i.e., without providing the entire second image) through the second lens when providing the first sub-image through the first lens. The second lens may overlap the second display region.

A display device according to one or more embodiments may substantially prevent or mitigate visible or conspicuous artifacts in displayed images. Advantageously, quality of the displayed images may be satisfactory.

BRIEF DESCRIPTION OF THE DRAWINGS

FIG. 3A is a diagram illustrating a display panel set included in the head mounted display device of FIG. 1 according to embodiments.

FIG. 4C and FIG. 4D are diagrams illustrating images displayed by a display panel set according to embodiments.

FIG. 6A is a diagram illustrating images displayed by a display panel set according to embodiments.

FIG. 7 is a diagram illustrating a display panel set according to embodiments.

DESCRIPTION OF EMBODIMENTS

Embodiments are described with reference to the accompanying drawings. Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively. In this application, "head mounted" may mean "head-mounted"; "sub-pixel" may mean "sub-pixel"; "panel" may mean "panel set"; "data" may mean "data set"; "sub-data" may mean "data subset"; "sub-converted data" may mean "converted data subset"; "connect" may mean "electrically connect"; "displaying region" may mean "display region"; "first type" may mean "first-type"; "same" may mean "identical"; "the same as" may mean "identical to".

Figure 1:
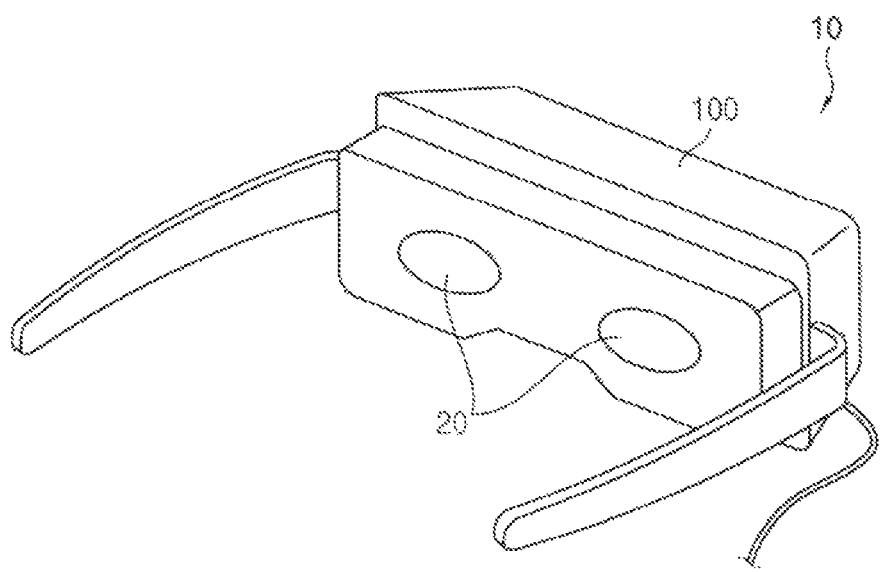
FIG. 1 is a diagram illustrating a head mounted display device according to example embodiments.

FIG. 1 is a diagram illustrating a head mounted display device according to example embodiments.

Referring to FIG. 1, the head mounted display device 10 (or head mounted display system) may include a display device 100 and lenses 20. The head mounted display device 10 may be mounted on a head of a user and may further include a frame (or a case) to support the display device 100 and/or the lenses 20. The lenses 20 may be spaced from the display device 100 by a specified distance.

The display device 100 may include a first display region and a second display region. The first display region may display a left image. The second display region may display a right image. The lenses 20 may provide the eyes of the user with one or more images display by the display device 100 when the head mounted display device 100 is mounted on the user. For example, the lenses 20 may be eyepieces (or ocular eye pieces). The lenses 20 may include a left lens and a right lens. The left lens may overlap the first display region and may provide a left sub-image (i.e., part of the left image) to the left eye of the user. The right lens may overlap the second display region and may provide a right sub-image (i.e., part of the right image) to the right eye of the user.

The head mounted display device 10 may further include one or more of other lenses, a reflector, and optical elements for forming and adjusting one or more optical paths such that images displayed by the display device 100 may be optimally provided to the eyes of the user.

Figure 2:
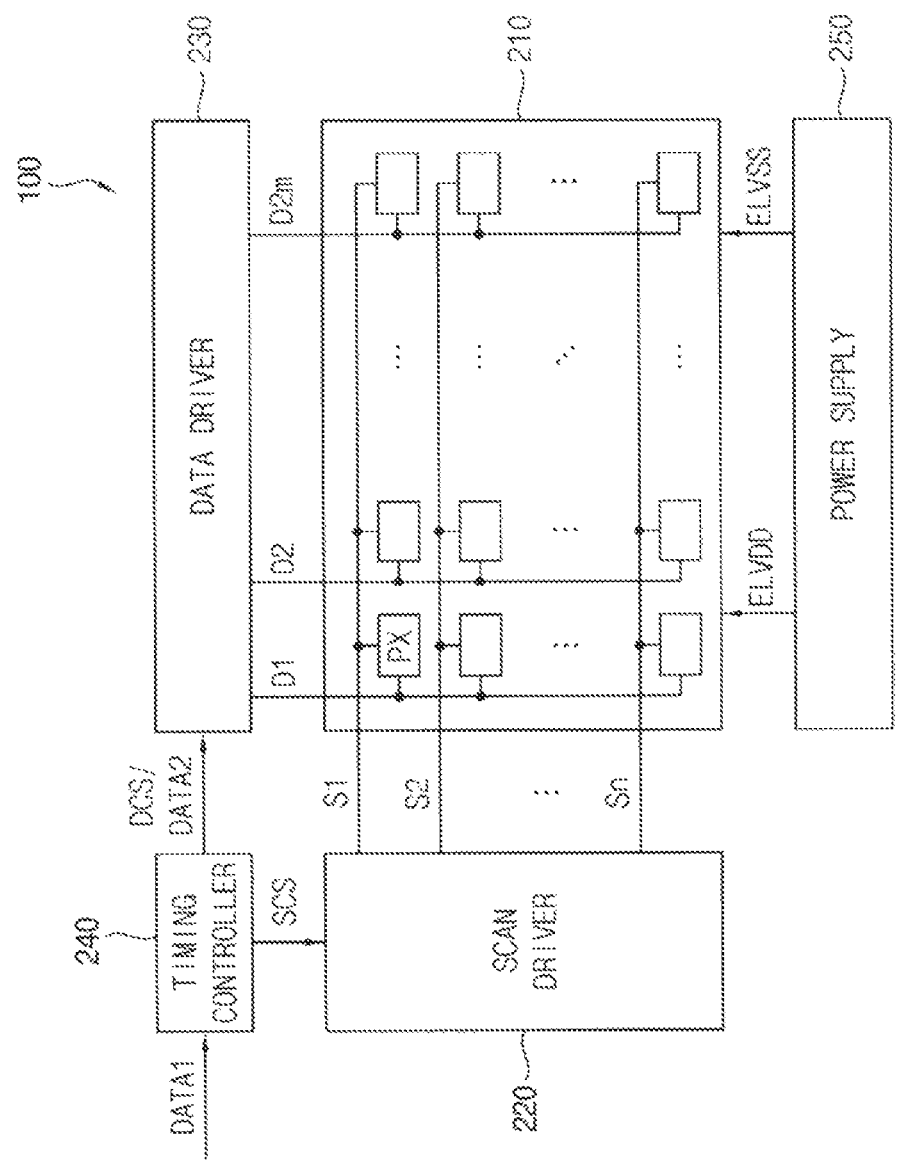
FIG. 2 is a block diagram illustrating a display device included in the head mounted display device of FIG. 1 according to embodiments.

FIG. 2 is a block diagram illustrating a display device included in the head mounted display device of FIG. 1 according to embodiments. FIG. 3A is a diagram illustrating a display panel set included in the head mounted display device of FIG. 1 according to embodiments.

Referring to FIG. 2, the display device 100 may include a display panel set 210, a scan driver 220, a data driver 230, a timing controller 240, and a power supply 250. The display device 100 may display an image based on input image data (e.g., first data DATA1) provided from an external component (e.g., a graphics card). For example, the display device 100 may be an organic light emitting display device. The input image data may be a 3-dimension (or 3D) image data. For example, the input image data may include left image data and right image data for providing different images to the eyes of the user.

The display panel set 210 may include scan lines S1, S2, through Sn; data lines D1, D2, through D2m; and pixels PX, where each of n and m is an integer greater than or equal to 2. The pixels PX may be located in/near intersections of the scan lines S1 through Sn and the data lines D1 through D2m. A pixel PX may store a data signal (e.g., a data signal provided through one of the data lines D1 through D2m) in response to a scan signal (e.g., a scan signal provided through one of the scan lines S1 through Sn) and may emit a light based on the stored data signal. The display panel set 210 may be implemented as a display panel set 310 discussed with reference to FIG. 3A or a display panel set 320 discussed with reference to FIG. 3B.

Referring to FIG. 3A, the display panel set 310 may include a first displaying region R1 and a second displaying region R2. The first displaying region R1 may display a first image (e.g., a left image) for one of the eyes of the user (e.g., for a left eye of the user), and the second displaying region R2 may display a second image (e.g., a right image) for the other of the eyes of the user (e.g., for a right eye of the user). For example, the first displaying region R1 may include a first pixel column through an mth pixel column, and the second displaying region R2 may include an m+1th pixel column through a 2mth pixel column.

The input image data may include valid values corresponding to a third displaying region R3 and a fourth displaying region R4. In embodiments, the first image (e.g., a left image) may be displayed on the third displaying region R3 and provided (and/or shown) through the left lens to the left eye of the user, and the second image (e.g., a right image) may be displayed on the fourth displaying region R4 and provided (and/or shown) through the right lens to the right eye of the user. Because images displayed by the display device 100 may be distorted by the lenses 20, the input image data may include the valid values corresponding to the third and fourth displaying regions R3 and R4 and may include an invalid value (e.g., a black data value, 0) corresponding to the display panel set 310 but outside the third and fourth displaying regions R3 and R4.

In some example embodiments, the third displaying region R3 may correspond to a j+1th column through a j+kth pixel column, and the fourth displaying region R4 may correspond to an m+j+2th pixel column through an m+j+k+1th pixel column. The fourth displaying region R4 may be shifted by one pixel column (in addition to the m columns) in a row direction compared with the third displaying region R3. In embodiments, the second image (e.g., the right image) may be displayed while being shifted with one pixel column in the row direction compared with the first image (e.g., the left image). Related operation and effects will be further described with reference to FIGS. 4A through 4D.

Figure 3B:
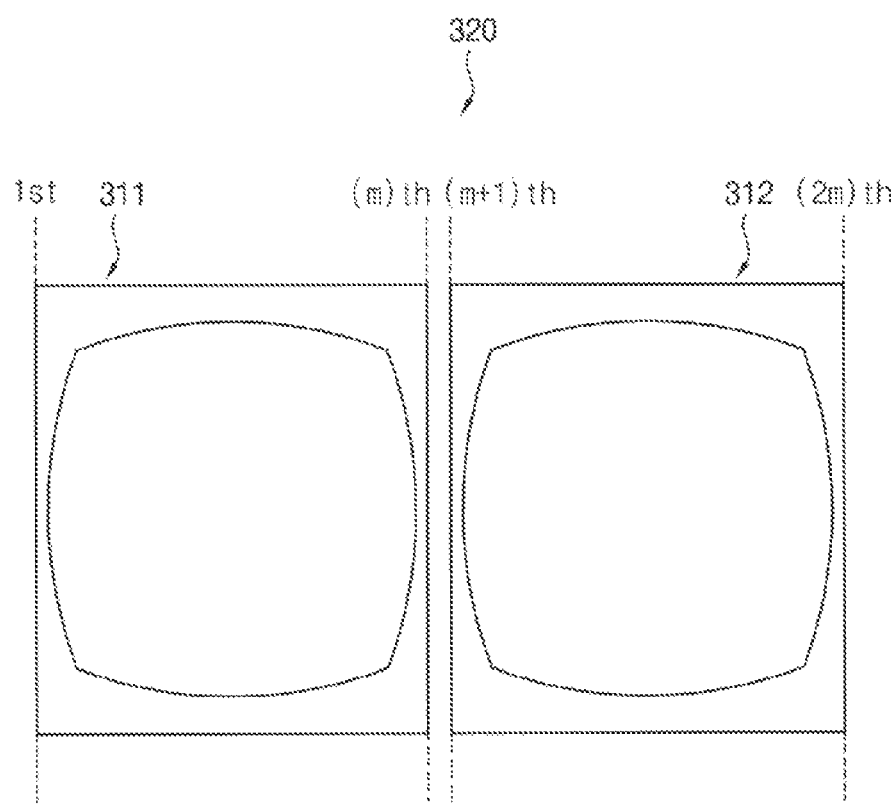
FIG. 3B is a diagram illustrating a display panel set included in the head mounted display device of FIG. 1 according to embodiments.

In some example embodiments, the display panel set 210 may include display panels which are independent from each other. Referring to FIG. 3B, the display panel set 201 may be implemented as the display panel set 320, which may include a first display panel 311 and a second display panel 312. The first display panel 311 may be substantially analogous to the first displaying region R1 illustrated in FIG. 3A, and the second display panel 312 may be substantially analogous to the second displaying region R2 illustrated in FIG. 3A. In embodiments, the display device 100 may include two display panels (e.g., the first and second display panels 311 and 312) instead of one display panel (e.g., the display panel 210) and may drive the display panels (e.g., the first and second display panels 311 and 312) independently from each other.

Referring again to FIG. 2, the scan driver 220 may generate scan signals based on a scan driving control signal SCS. The scan driving control signal SCS may include a start signal (or a start pulse) and clock signals, and the scan driver 220 may include shift registers sequentially generating scan signals based on the start signal and the clock signals.

The data driver 230 may generate data signals in response to a data driving control signal DCS. The data driver 230 may generate the data signal in an analog form based on image data (e.g., second data DATA2) in a digital form. The data driver 230 may generate data signals based on grayscale voltages (or gamma voltages) predetermined, where the grayscale voltages may be provided from a gamma circuit. The data driver 230 may provide data signals to pixels included in pixel columns.

The timing controller 240 may receive input image data (e.g., the first data DATA1) and input control signals (e.g., a horizontal synchronization signal, a vertical synchronization signal, and clock signals) from an external component (e.g., an application processor) and may generate converted data (e.g., the second data DATA2) suitable for the display panel 210 to display an image. In embodiments, the timing controller 240 may control the scan driver 220 and the data driver 230. The timing controller 240 may generate the scan driving control signal SCS and the data driving control signal DCS based on the input control signals.

In some example embodiments, the timing controller 240 may generate the converted data (e.g., the second data DATA2) by changing orders of line data included in the second image data corresponding to the second displaying region R2. In embodiments, the line data may correspond to pixel columns (e.g., the m+1th through 2mth pixel columns). In embodiments, the timing controller 240 may generate the converted data by maintaining orders of line data included in the first image data corresponding to the first displaying region R1 (e.g., by not changing the order of line data corresponding to the first through mth pixel columns). In embodiments, the timing controller 240 may generate the converted data by maintaining the first image data and by changing (or by delaying) the orders of some data among the second image data.

The timing controller 240 may alleviate visibility of an artifact by converting the second data to be different from the first image data (and/or by converting the second image data to be asymmetric with the first image data).

The power supply 250 may generate a driving voltage and may provide the driving voltage to the display panel 210 (or the pixel PX). In embodiments, the driving voltage may be power voltages required to drive the pixel PX. For example, the driving voltage may include a first power voltage ELVDD and a second power voltage ELVSS. In embodiments, the first power voltage ELVDD may be greater (or higher) than the second power voltage ELVSS.

As described above, the display device 100 according to example embodiments may generate converted data (e.g., the second data DATA2) by changing orders of the line data included in the second image data corresponding to the second displaying region R2. In embodiments, the display device 100 may reduce visibility of an artifact by converting the second data to be asymmetric with the first image data.

Figure 4A:
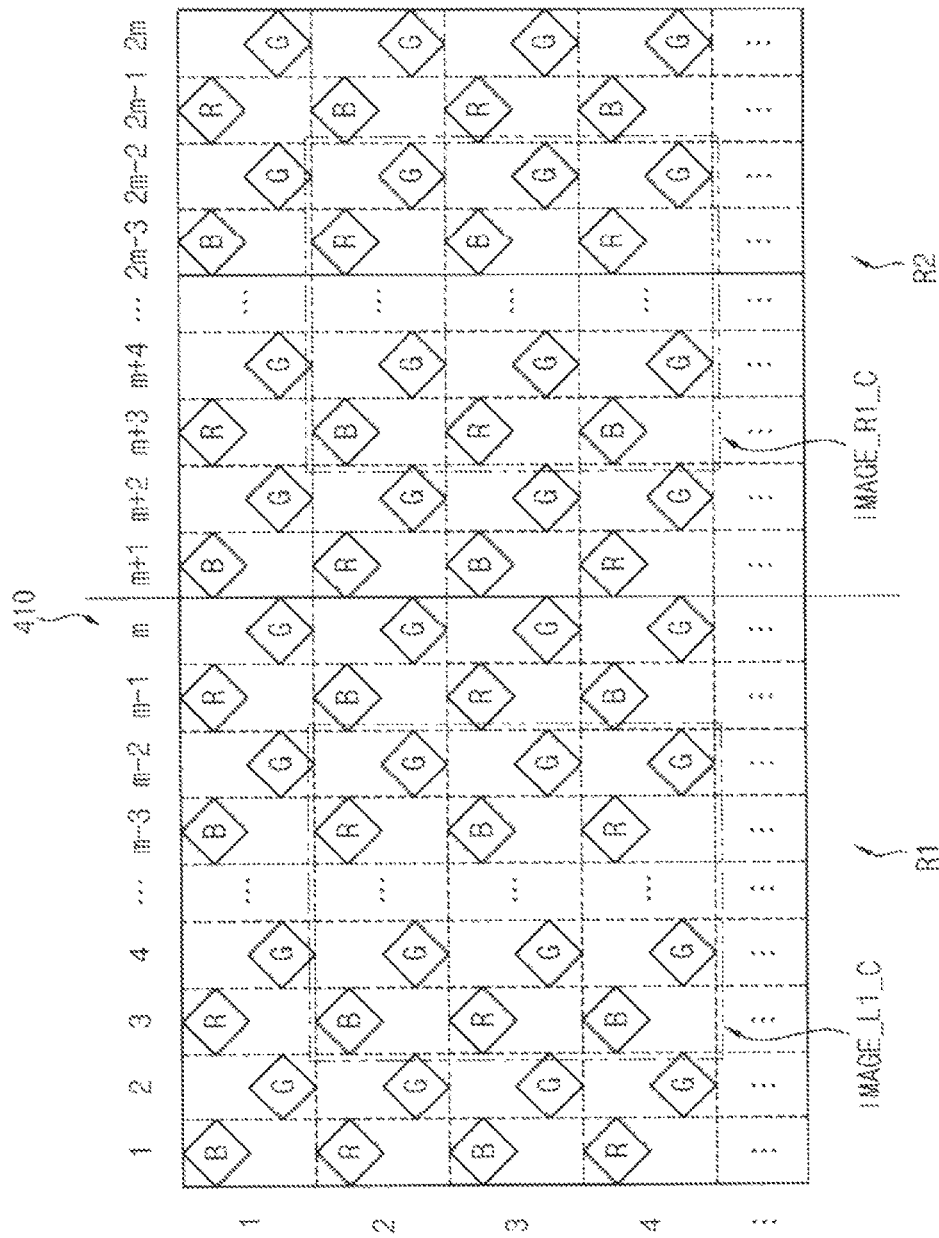
FIG. 4A and FIG. 4B are diagrams illustrating images displayed by a display panel set according to embodiments.
Figure 4B:
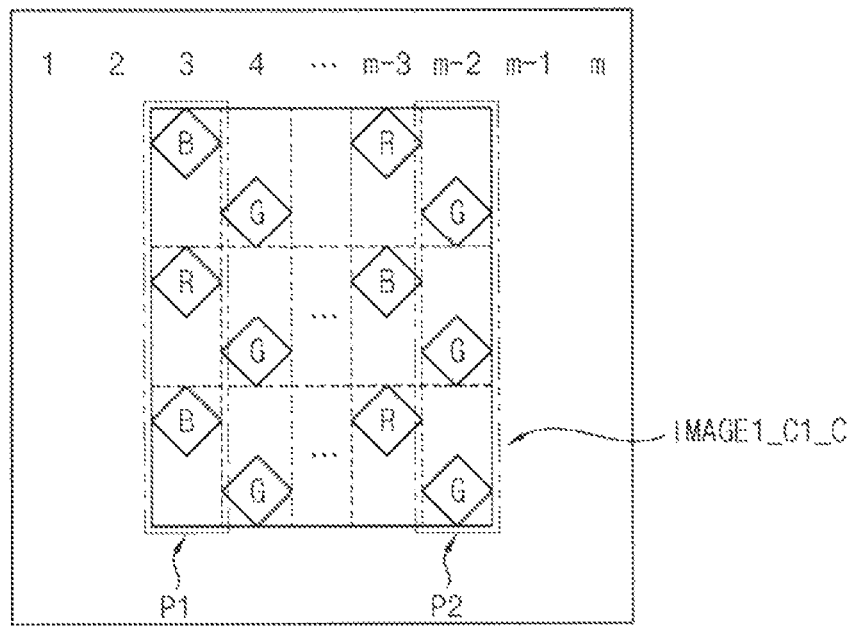

FIGS. 4A and 4B are diagrams illustrating images displayed by a display panel set according to embodiments. A display panel set of the head mounted display device 10 may be implemented as a display panel 410 discussed with reference to FIG. 4A.

Referring to FIG. 4A, the display panel 410 may include pixels R, and B which are arranged in a Pentile™ format. For example, the pixels R, and B are arranged in a diamond Pentile format. According to the Pentile format, the display panel 410 may include first type pixel columns and second type pixel columns arranged alternately and repeatedly.

The first type pixel columns may include first pixels R and third pixels B arranged alternately in a column direction. In embodiments, each first pixel R may emit a light with a first color (e.g., a red color), and each third pixel B may emit a light with a third color (e.g., a blue color). The first type pixel columns may include odd-numbered pixel columns such as a first pixel column, a third pixel column, etc.

The second type pixel columns may include second pixels G arranged in a column direction. In embodiments, each second pixel G may emit a light with a second color (e.g., a green color). The second type pixel columns may include even-numbered pixel columns such as a second pixel column, a fourth pixel column, etc.

As illustrated in FIG. 4A, a first comparative left image IMAGE_L1_C (e.g., an image corresponding to a left eye of the user) may be displayed on the first displaying region R1, and a first comparative right image IMAGE_R1_C (e.g., an image corresponding to a right eye of the user) may be displayed on the second displaying region R2. The first comparative left image IMAGE_L1_C may correspond to a third pixel column through an m−2th pixel column, and the first comparative right image IMAGE_R1_C may correspond to an m+3th pixel column through a 2m−2th pixel column (or a third pixel column through an m−2th pixel column in the second displaying region R2).

As illustrated in FIG. 4B, a first comparative composite image IMAGE_C1_C may be seen by the user and may be represented by summing the first comparative left image IMAGE_L1_C and the first comparative right image IMAGE_R1_C.

Because a pixel arrangement corresponding to the first comparative left image IMAGE_L1_C is substantially the same as (i.e., identical to) a pixel arrangement corresponding to the first comparative right image IMAGE_R1_C, a pixel arrangement corresponding to the first comparative composite image IMAGE_C1_C may be substantially the same as (i.e., identical to) a pixel arrangement corresponding to the first comparative left image IMAGE_L1_C and/or may be substantially identical to the first comparative right image IMAGE_R1_C.

In embodiments, an artifact may occur (and/or may be visible to the user) at an edge of the first comparative composite image IMAGE_C1_C (or at an edge or at a boundary of an object in the first comparative composite image IMAGE_C1_C). For example, when the first comparative composite image IMAGE_C1_C is an image with a full white pattern, a first color (e.g., a red color corresponding to the first pixel R) and a third color (e.g., a blue color corresponding to the third pixel B) may be seen at a first portion P1 corresponding to the third pixel column, and a second color (e.g., a green color corresponding to the second pixel, green line) may be seen at a second portion P2 corresponding to the m−2th pixel column.

The display device 100 according to example embodiments may mitigate visibility of the artifact by changing orders of line data included in the right image data corresponding to the second displaying region R2.

Figure 4D:
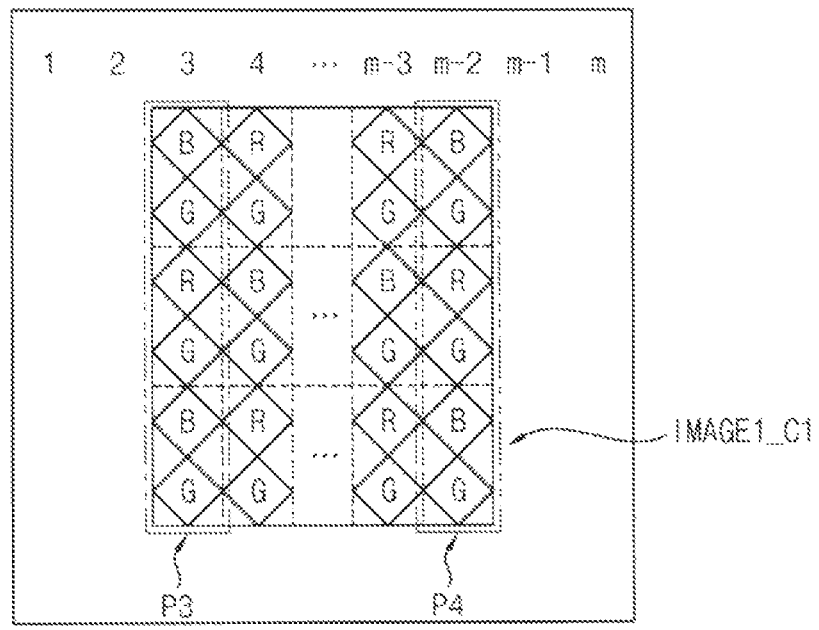

FIGS. 4C and 4D are diagrams illustrating an example of an image displayed by a display panel set according to embodiments.

Referring to FIG. 4C, a first left image IMAGE_L1 (e.g., an image corresponding to the left eye of the user) may be displayed on the first displaying region R1, and a first right image IMAGE_R1 (e.g., an image corresponding to the right eye of the user) may be displayed on the second displaying region R2. The first left image IMAGE_L1 may correspond to the third pixel column through the m−2th pixel column and may be substantially the same as the first comparative left image IMAGE_L1_C described with reference to FIG. 4A. The first right image IMAGE_R1 may correspond an m+4th pixel column through a 2m−1th pixel column and may be shifted by one pixel column in a first direction (or in a row direction) with respect to the first comparative right image IMAGE_R1_C described with reference to FIG. 4A.

In some example embodiments, the display device 100 may shift first line data corresponding to the first type pixel columns (e.g., corresponding to the odd-numbered pixel columns) in the second displaying region R2. For example, the display device 100 may map (or remap, correspond) line data corresponding to the m+3th pixel column illustrated in FIG. 4A to an m+5th pixel column adjacent to the m+3th pixel column. On the other hand, the display device 100 may maintain (or not remap) second line data corresponding to the second type pixel columns (e.g., corresponding to the even-numbered pixel columns) in the second displaying regions R2. That is, the display device 100 may remap only the first line data corresponding to the first type pixel columns not the second line data corresponding to the second type pixel columns in the second displaying regions R2. In embodiments, the first right image IMAGE_R1 may be shifted by one pixel column in the first direction (or in the row direction) with respect to the first comparative right image IMAGE_R1_C described with reference to FIG. 4A.

As illustrated in FIG. 4D, a first composite image IMAGE_C1 may be seen by the user and may be represented by summing the first left image IMAGE_L1 and the first right image IMAGE_R1.

A pixel arrangement corresponding to the first left image IMAGE_L1 may be different from a pixel arrangement corresponding to the first right image IMAGE_R1 and may compensate the pixel arrangement corresponding to the first right image IMAGE_R1. Compared with the first portion P1 described with reference to FIG. 4B, a third portion P3 corresponding to the third pixel column may further include the second color. Therefore, the first through third colors are mixed at the third portion P3 such that the first color and third color may not be visible or conspicuous to the user. Similarly, compared with the second portion P2 described with reference to FIG. 4B, a fourth portion P4 corresponding to the m−2th pixel column may further include the first color and the third color. Therefore, the second color (e.g., a green line) may not be visible or conspicuous to the user.

As described with reference to FIGS. 4A through 4D, the display device 100 according to example embodiments may mitigate undesirable visibility of artifacts by changing orders or mapping of line data included in the second image data (or in the right image data) corresponding to the second displaying region R2.

In FIG. 4C, the first right image IMAGE_R1 is described to be shifted in the first direction with reference to the first comparative right image IMAGE_R1_C described with reference to FIG. 4A. However, embodiments are not limited thereto. For example, the first left image IMAGE_L1 may be shifted in the first direction with respect to the first comparative left image data IMAGE_L1_C described with reference to FIG. 4A. In embodiments, the left image IMAGE_L1 and the first right image IMAGE_R1 may be different from each other to compensate (or supplement, complement) each other.

Figure 5A:
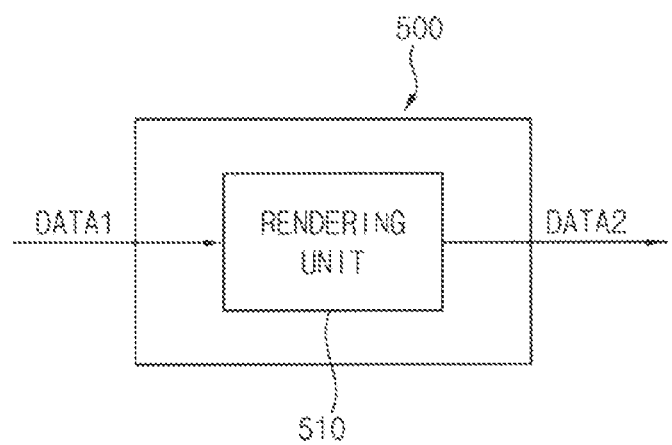
FIG. 5A is a block diagram illustrating a timing controller included in the head mount display device of FIG. 1 according to embodiments.
Figure 5B:
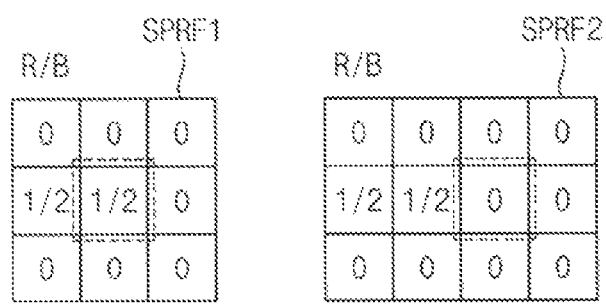
FIG. 5B is a diagram illustrating a sub-pixel (or sub-pixel) rendering filter used by the timing controller of FIG. 5A according to embodiments.
Figure 5C:
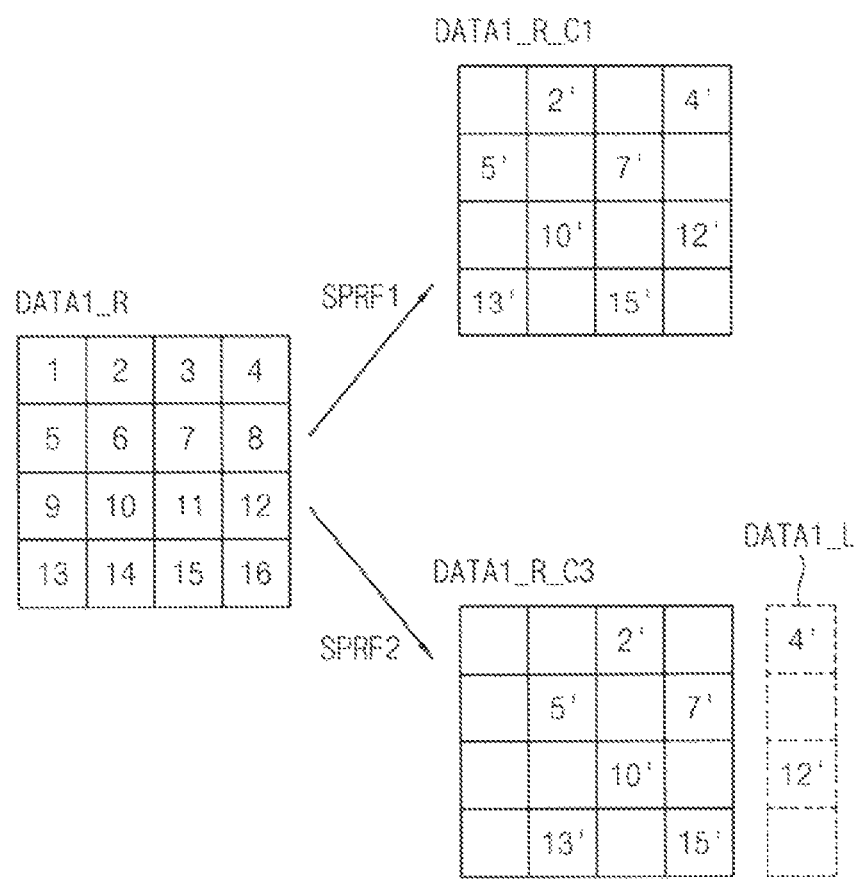
FIG. 5C is a diagram illustrating converted data processed and/or provided by the sub-pixel rendering filter of FIG. 5B according to embodiments

FIG. 5A is a block diagram illustrating a timing controller included in the head mount display device of FIG. 1 according to embodiments. FIG. 5B is a diagram illustrating a sub-pixel rendering filter used by the timing controller of FIG. 5A according to embodiments. FIG. 5C is a diagram illustrating converted data processed and/or provided by the sub-pixel rendering filter of FIG. 5B according to embodiments.

The timing controller 240 illustrated in FIG. 2 may be implemented as a timing controller 540 discussed with reference to one or more of FIGS. 5A, 5B, 5C, 6B, and 6C. Referring to FIG. 5A, the timing controller 500 may include a rendering unit 510. The rendering unit 510 may convert the input image data in a stripe format (e.g., data in RGB format) into converted data in the Pentile format (e.g., data in RGBG format). For reference, pixel data in the input image data may correspond to a reference pixel PXR illustrated in FIG. 4C, and the reference pixel PXR may include a half of a first pixel R, a half of a third pixel B, and a second pixel G.

In some example embodiments, the timing controller 500 may generate the converted data using a first sub-pixel rendering filter SPRF1 and a second sub-pixel rendering filter SPRF2 illustrated in FIG. 5B.

For example, the timing controller 500 may apply the first sub-pixel rendering filter SPRF1 to the first image data (e.g., left data corresponding to the first displaying region R1) (i.e., may perform a first sub-pixel rendering) and may apply the second sub-pixel rendering filter SPRF2 to the second image data (e.g., right data corresponding to the second displaying region R2) (i.e., may perform a second sub-pixel rendering).

The timing controller 500 may perform sub-pixel rendering to the first sub-data (or, first line data) corresponding to the first pixel R and the third pixel B but may perform no sub-pixel rendering to second sub-data (e.g., second line data) corresponding to the second pixel G because the reference pixel PXR may include one second pixel G.

As illustrated in FIG. 5B, the first sub-pixel rendering filter SPRF1 may include weights for a corresponding pixel (or a target pixel) and a first adjacent pixel which is adjacent to the corresponding pixel. In embodiments, the first adjacent pixel may be included in a pixel row including the corresponding pixel and may be included in a pixel column positioned immediately at the left side of a pixel column including the corresponding pixel. In embodiments, each of the weights may be ½ (or 0.5).

As illustrated in FIG. 5C, first sub-converted data DATA1_R_C1 (or first converted data subset DATA1_R_C1) may be generated by applying the first sub-pixel rendering filter SPRF1 to first sub-data DATA1_R and may be used for the first displaying region R1.

The first sub-converted data DATA1_R_C1 may include data values corresponding to a 12th pixel (e.g., a pixel located in a first row and a second column), a 14th pixel, a 21th pixel, a 23th pixel, etc. according to a pixel arrangement (e.g., according to a pixel arrangement in the Pentile format). For example, a data value corresponding to the 12th pixel (e.g., 2') in the first sub-converted data DATA1_R_C1 may be equal to an average of a data value corresponding to the 11th pixel (e.g., 1) and a data value corresponding to the 12th pixel (e.g., 2) in the first sub-data DATA1_R (or first data subset DATA1_R) according to the first sub-pixel rendering filter SPRF1.

Referring again to FIG. 5B, the second sub-pixel rendering filter SPRF2 may include weights for the first adjacent pixel adjacent to the corresponding pixel and a second adjacent pixel. In embodiments, the second adjacent pixel may be included in the pixel row including the first adjacent pixel and may be included in a pixel column positioned immediately at the left side of the pixel column including the first adjacent pixel. In embodiments, each of the weights may be ½ (or 0.5).

As illustrated in FIG. 5C, third sub-converted data DATA1_R_C3 (or third converted data subset DATA1_R_C3) may be generated by applying the second sub-pixel rendering filter SPRF2 to first sub-data DATA1_R and may be used for the second displaying region R2.

The third sub-converted data DATA1_R_C3 may include data values corresponding to a 13th pixel (e.g., a pixel located in a first row and a third column), a 22th pixel, a 24th pixel, etc. according to the pixel arrangement (e.g., according to a pixel arrangement in the Pentile format). For example, a data value corresponding to the 13th pixel (e.g., 2') in the third sub-converted data DATA1_R_C3 may be equal to an average of a data value corresponding to the 11th pixel (e.g., 1) and a data value corresponding to the 12th pixel (e.g., 2) in the first sub-data DATA1_R according to the second sub-pixel rendering filter SPRF2.

A loss data set DATA1_L may occur because the third sub-converted data DATA1_R_C3 is shifted with respect to the first sub-converted data DATA1_R_C1.

However, as described with reference to FIG. 3A, the input image data includes valid values (or valid data values) corresponding to the fourth displaying region R4 and includes invalid values (e.g., a black data value) corresponding to portions of the second displaying region R2 outside the fourth displaying region R4. Therefore, the loss data DATA1_L may include only invalid values such that the first composite image IMAGE_C1 illustrated in FIG. 4D (e.g., an image corresponding to the third sub-converted data DATA1_R_C3) may be displayed satisfactorily and/or normally.

As described with reference to FIGS. 5A through 5C, the timing controller 500 may generate right image data to supplement left image data by changing orders and/or mapping in the second image data corresponding to the second displaying region R2 (e.g., by shifting the first line data in the second image data in the first direction) during performing the sub-pixel rendering. Therefore, the display device 100 may mitigate visibility of artifacts in displayed images.

Figures 6B, 6C:
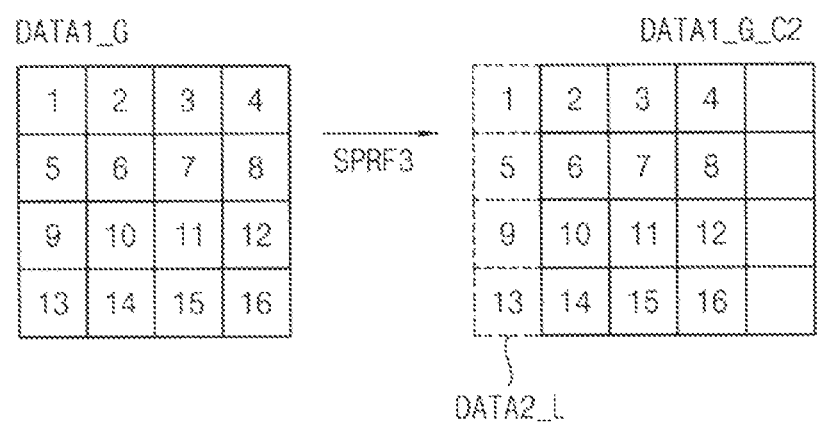
FIG. 6B is a diagram illustrating a sub-pixel rendering filter used by the timing controller of FIG. 5A according to embodiments.
FIG. 6C is a diagram illustrating converted data processed and/or provided by the sub-pixel rendering filter of FIG. 6B according to embodiments.

FIG. 6A is a diagram illustrating images displayed by a display panel set according to embodiments. The display panel set 210 illustrated in FIG. 2 may be implemented as a display panel set discussed with reference to FIG. 6A. FIG. 6B is a diagram illustrating a sub-pixel rendering filter used by the timing controller of FIG. 5A according to embodiments. FIG. 6C is a diagram illustrating converted data processed and/or provided by the sub-pixel rendering filter of FIG. 6B according to embodiments.

Referring to FIG. 6A, the display panel 610 and a second left image IMAGE_L2 illustrated in FIG. 6A may be substantially the same as the display panel 410 and the first left image IMAGE_L1_C described with reference to FIG. 4A.

The second right image IMAGE_R may correspond to an m+2th pixel column through a 2m−3th pixel column (or a second pixel column through an m−3th pixel column in the second displaying region R2) and may be shifted by one pixel column in a second direction (e.g., in a direction opposite to the first direction) with respect to the first comparative right image IMAGE_R1_C described with reference to FIG. 4A.

In some example embodiments, the display device 100 may shift second line data corresponding to the second type pixel columns (e.g., the even-numbered pixel columns) in the second displaying region R2 in the second direction. For example, the display device 100 may map (or remap, correspond) line data corresponding to an m+4th pixel column illustrated in FIG. 4A to an m+2th pixel column adjacent to the m+2th pixel column. On the other hand, the display device 100 may maintain (or not remap) first line data corresponding to the first type pixel columns (e.g., the odd-numbered pixel columns) in the second displaying region R2. That is, the display device 100 may remap only line data corresponding to the even-numbered pixel columns not line data corresponding to the odd-numbered pixel columns in the second displaying regions R2. In embodiments, the second right image IMAGE_R2 may be shifted by one pixel column in the second direction with respect to the first comparative right image IMAGE_R1_C described with reference to FIG. 4A.

A second composite image displayed to (or seen by) the user may be represented by summing the second left image IMAGE_L2 and the second right image IMAGE_R2 and may be similar to the first composite image IMAGE_C1. Therefore, substantially no artifact may be conspicuous or visible to the user.

In some example embodiments, the timing controller 500 may generate the converted data by applying a third sub-pixel rendering filter SPRF3 to the input image data.

For example, the timing controller 500 may apply the third sub-pixel rendering filter SPRF3 to produce the right data corresponding to the second displaying region R2. But the timing controller 500 may not apply the third sub-pixel rendering filter SPRF3 (and/or may apply no sub-pixel rendering filter) to produce the left data corresponding to the first displaying region R1.

As illustrated in FIG. 6B, the third sub-pixel rendering filter SPRF3 may include a weight for an adjacent pixel adjacent to a corresponding pixel. In embodiments, the adjacent pixel may be included in a pixel row including the corresponding pixel and may be included in a pixel column positioned immediately at the right side of a pixel column including the corresponding pixel. In embodiments, the weights may be ½ (or 0.5).

As illustrated in FIG. 6C, second sub-converted data DATA1_G_C2 (or second converted data subset DATA1_G_C2) may be generated by applying the third sub-pixel rendering filter SPRF3 to second sub-data DATA1_G (e.g., second sub-data of the second image data corresponding to the second displaying region R2).

A loss data set DATA2_L may occur because the second sub-converted data DATA1_G_C2 is shifted with respect to the second sub-data DATA_G1.

However, as described with reference to FIG. 3A, the input image data includes valid values (or valid data values) corresponding to the fourth displaying region R4 and includes invalid values (e.g., a black data value) corresponding to portions of the second displaying region R2 outside the fourth displaying region R4. Therefore, the loss data DATA2_L may include only invalid values such that the second composite image (e.g., an image corresponding to the second sub-converted data DATA1_G_C2) may be displayed normally and/or satisfactorily.

As described with reference to FIGS. 6A through 6C, the display device 100 may output the second right image IMAGE_R2 to supplement the left image IMAGE_L2 by changing orders and/or mapping in the second image data corresponding to the second displaying region R2 (e.g., by shifting the second line data in the second image data in the second direction) during performing the sub-pixel rendering. Therefore, the display device 100 may mitigate visibility of artifacts in displayed images.

The display device 100 is described in FIG. 4A through 6C to include pixels R, and B arranged in the Pentile format. This is illustrated by way of an example. However, embodiments are not limited thereto. In embodiments, the display device 100 may include pixels R, and B arranged in a stripe format.

FIG. 7 is a diagram illustrating a display panel set according to embodiments. The display panel set 210 illustrated in FIG. 2 may be implemented as a display panel set 710 discussed with reference to FIG. 7.

Referring to FIG. 7, the display panel set 710 may include pixels R, and B arranged in a stripe format. For example, the display panel 710 may include first pixels R, second pixels and third pixels B which are arranged in the first direction (or in the column direction) sequentially and repeatedly.

As illustrated in FIG. 7, a third left image IMAGE_L3 (e.g., an image corresponding to the left eye of the user) may be displayed on the first displaying region R1, and a third right image IMAGE_R3 (e.g., an image corresponding to the right eye of the user) may be displayed on the second displaying region R2. The third left image IMAGE_L3 may correspond to a fourth pixel column through an m−3th pixel column, and the third right image IMAGE_R3 may correspond to an m+3th pixel column through a 2m−4th pixel column (or a third pixel column through an m−4th pixel column in the second displaying region R2). The third right image IMAGE_R3 may be shifted by one pixel column in the second direction with respect to the third left image IMAGE_L3.

In some example embodiments, the display device 100 may shift line data corresponding to a 3kth pixel column (e.g., an m+3th pixel column, a 2mth pixel column, etc.) in the second displaying region R2 in the second direction, where k is a positive integer. For example, the display device 100 may remap line data corresponding to an m+6th pixel column (e.g., a pixel column including the second pixel B) to the m+3th pixel column. For example, the display device 100 may shift the line data (e.g., line data corresponding to the pixel column including the second pixel B) using the third sub-pixel rendering filter SPRF3 described with reference to FIG. 6B.

On the other hand, the display device 100 may maintain (or not remap) line data corresponding to a 3k−2th pixel column and a 3k−1th pixel column in the second displaying region R2. In embodiments, third right image IMAGE_R3 may be shifted by one pixel column with respect to a third left image IMAGE_L3.

A third composite image displayed to (or seen by) the user may be represented by summing the third left image IMAGE_L3 and the third right image IMAGE_R3, and the third right image IMAGE_R3 may complement the third left image IMAGE_L3. Therefore, substantially no artifact may be conspicuous or visible to the user.

The third right image IMAGE_R3 is described to be shifted by one pixel column in the second direction with respect to the third left image IMAGE_L3 in FIG. 7. This is illustrated by way of an example. However, embodiments are not limited thereto. In embodiments, the third right image IMAGE_R3 may be shifted in the first direction opposite to the second direction with respect to the third left image IMAGE_L3 or may be shifted by two pixel columns.

Figure 8:
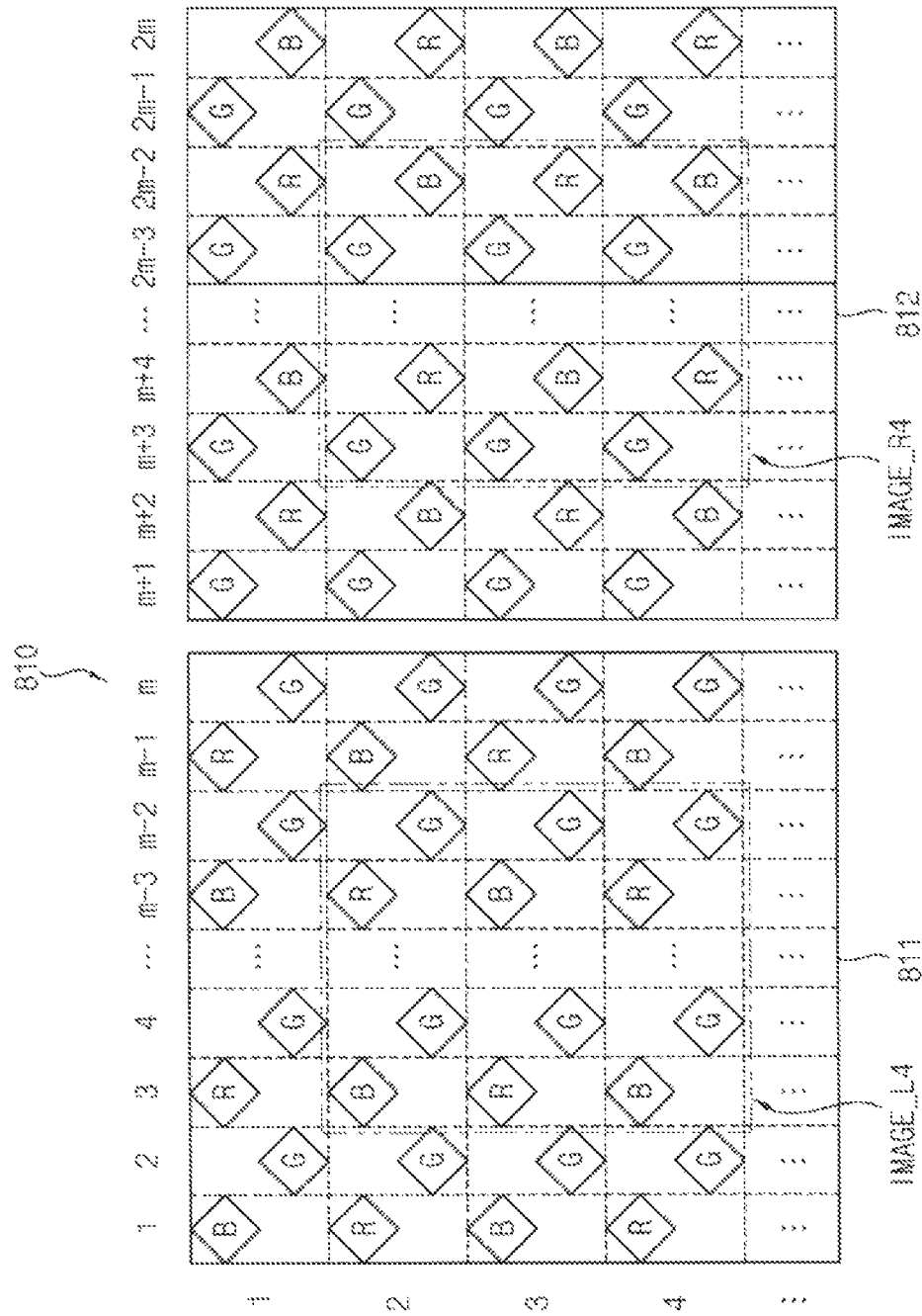
FIG. 8 is a diagram illustrating a display panel set according to embodiments.

FIG. 8 is a diagram illustrating a display panel set according to embodiments. The display panel set 210 illustrated in FIG. 2 may be implemented as a display panel set 810 discussed with reference to FIG. 8.

Referring to FIG. 8, the display panel 810 may include a first display panel 811 and a second display panel 812. The first display panel 811 may be substantially the same as the first display panel 311 described with reference to FIG. 3B, and the second display panel 812 may be substantially the same as the second display panel 312 described with reference to FIG. 3B.

The first display panel 811 and the second display panel 812 may include pixels R, G, and B arranged in the Pentile format. The first display panel 811 may include the pixel R, G, and B arranged in a first pixel arrangement, but the second display panel 812 may include the pixel R, and B arranged in a second pixel arrangement. In embodiments, the second pixel arrangement may be different from the first pixel arrangement. For example, the second pixel arrangement may be opposite to the first pixel arrangement. For example, the first pixel arrangement may have an order such as BGRG, and the second pixel arrangement may have an order such as GRGB.

In embodiments, a first pixel column of the first display panel 811 may include third pixels B and first pixels R arranged alternately, and a second pixel column of the first display panel 811 may include second pixel G In embodiments, in the first display panel 811, odd-numbered pixel columns may include third pixels B and first pixels R, and even-numbered pixel columns may include second pixels G.

An m+1th pixel column (or a first pixel column) of the second panel 812 may include second pixels G and an m+2th pixel column (or a second pixel column) of the second display panel 812 may include third pixels B and first pixels R arranged alternately. In embodiments, in the second display panel 812, odd-numbered pixel columns may include second pixels and even-numbered pixel columns may include third pixels B and first pixels R.

As illustrated in FIG. 8, a fourth left image IMAGE_L4 (e.g., an image corresponding to the left eye of the user) may be displayed on the first display panel 811, and a fourth right image IMAGE_R4 (e.g., an image corresponding to the right eye of the user) may be displayed on the second display panel 812. The fourth left image IMAGE_L4 may correspond to a third pixel column through an m−2th pixel column, and the fourth right image IMAGE_R4 may correspond to an m+3th pixel column through an 2m−2th pixel column (or a third pixel column through an m−2th pixel column in the second display panel 812).

A pixel arrangement corresponding to the fourth right image IMAGE_R4 may be different from a pixel arrangement corresponding to the fourth left image IMAGE_L4 and may supplement the pixel arrangement corresponding to the fourth left image IMAGE_L4.

Therefore, the display device 100 may supplement the fourth left image IMAGE_L4 displayed on the first display panel 811 using the fourth right image IMAGE_R4 displayed on the second display panel 812 without an additional processing of input image data. Therefore, substantially no artifacts may be conspicuous or visible to the user.

Embodiments may be applicable to various types of display devices (e.g., an organic light emitting display device, a liquid crystal display device, etc.). Embodiments may be applicable to one or more of a television, a computer monitor, a laptop, a digital camera, a cellular phone, a smart phone, a personal digital assistant (PDA), a portable multimedia player (PMP), an MP3 player, a navigation system, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. All such modifications are intended to be included within the scope defined in the claims. In the claims, means-plus-function clauses are intended to cover the structures described herein as performing the recited function and not only structural equivalents but also equivalent structures.

What is claimed is:

1. A display device comprising:
   a display panel including a first displaying region and a second displaying region adjacent to the first displaying region;
   a timing controller configured to receive first image data corresponding to the first displaying region and second image data corresponding to the second displaying region and to generate converted data by changing orders of line data included in the second image data; and
   a data driver configured to generate data signals based on the converted data and to provide the data signals to the display panel,
   wherein the timing controller maps a line data set corresponding to a corresponding first type pixel column of the second displaying region to a neighboring first type pixel column of the second displaying region, and
   wherein no intervening first type pixel column is positioned between the corresponding first type pixel and the neighboring first type pixel column.

2. The display device of claim 1, wherein the first displaying region corresponds to a left eye of a user, and
   wherein the second displaying region corresponds to a right eye of the user.

3. The display device of claim 1, wherein the timing controller generates the converted data by maintaining orders of line data included in the first image data corresponding to the first displaying region.

4. The display device of claim 1, wherein the second displaying region includes first type pixel columns and second type pixel columns arranged alternately, and
   wherein the timing controller generates the converted data by remapping first line data corresponding to the first type pixel columns in a first direction.

5. The display device of claim 4, wherein the first type pixel columns include a first pixel emitting a light with a first color, and
   wherein the second type pixel columns include a second pixel emitting a light with a second color.

6. The display device of claim 5, wherein the first type pixel columns further include a third pixel emitting a light with a third color.

7. The display device of claim 4, wherein the timing controller maps a kth line data corresponding to a kth pixel column to a k+1th pixel column adjacent to the kth pixel column, where k is a positive integer, and
   wherein the kth pixel column and the k+1th pixel column are included in the first type pixel columns.

8. The display device of claim 4, wherein the timing controller maps a kth line data corresponding to a kth pixel column to a k−1th pixel column adjacent to the kth pixel column, where k is a positive integer, and
   wherein the kth pixel column and the k−1th pixel column are included in the first type pixel columns.

9. The display device of claim 1, wherein the display panel includes pixels arranged in Pentile format, and
   wherein the timing controller includes a first sub-pixel rendering filter and a second sub-pixel rendering filter and generates the converted data by applying the second sub-pixel rendering filter to the second image data.

10. The display device of claim 9, wherein the second image data includes first sub-data and second sub-data, and
wherein the timing controller applies the second sub-pixel rendering filter to the first sub-data.

11. The display device of claim 10, wherein the second sub-pixel rendering filter has weights for a first adjacent pixel and a second adjacent pixel,
wherein the first adjacent pixel is adjacent to a target pixel, and
wherein the second adjacent pixel is adjacent to the first adjacent pixel.

12. The display device of claim 9, wherein the timing controller generates the converted data by applying the first sub-pixel rendering filter to first image data corresponding to the first displaying region, and
wherein the first sub-pixel rendering filter is different from the second sub-pixel rendering filter.

13. The display device of claim 12, wherein the first sub-pixel rendering filter has weights for a target pixel and a first adjacent pixel,
wherein the first adjacent pixel is adjacent to the target pixel.

14. The display device of claim 1, wherein the display panel includes pixels arranged in Pentile format, and
wherein the timing controller generates the converted data by applying a third sub-pixel rendering filter to the second image data.

15. The display device of claim 14, wherein the second image data includes first sub-data and second sub-data, and
wherein the timing controller applies the third sub-pixel rendering filter to the second sub-data.

16. The display device of claim 15, wherein the third sub-pixel rendering filter has a weight for a third adjacent pixel,
wherein the third adjacent pixel is adjacent to a target pixel.

17. A display device comprising:
a first display panel having a first pixel arrangement;
a second display panel adjacent to the first display panel and having a second pixel arrangement different from the first pixel arrangement;
a timing controller configured to generate first converted data corresponding to the first display panel based on stereoscopic image data and to generate second converted data corresponding to the second display panel based on the stereoscopic image data; and
a data driver configured to generate data signals based on the first converted data and the second converted data and to provide the data signals to the first display panel and the second display panel,
wherein no intervening display panel is positioned between the first display panel and the second display panel,
wherein the uppermost leftmost pixel of the first display panel displays a first color, and
wherein the uppermost leftmost pixel of the second display panel displays a second color different from the first color.

18. The display device of claim 17, wherein the second pixel arrangement is opposite to the first pixel arrangement.

19. A display device comprising:
a display panel including a first displaying region and a second displaying region adjacent to the first displaying region; and
a data driver configured to receive first image data corresponding to the first displaying region and second image data corresponding to the second displaying region, to generate first line data signals based on first line data included in the first image data, to generate second line data signals by applying a sub-pixel rendering filter to second line data included in second image data, and to provide the second line data signals to the display panel,
wherein the display panel includes pixels arranged in Pentile format.

20. The display device of claim 19, wherein the data driver shifts at least a portion of the second line data in a first direction.

* * * * *